(12) United States Patent
Borra et al.

(10) Patent No.: US 6,945,658 B2
(45) Date of Patent: Sep. 20, 2005

(54) REFLECTING MIRRORS SHAPED WITH MAGNETIC FIELDS

(75) Inventors: Ermanno Borra, Québec (CA); Anna Ritcey, Cap Rouge (CA); Philip R. Laird, Ste-Foy (CA)

(73) Assignee: Université Laval, Cité Universitaire Québec (CA)

( * ) Notice: Subject to any disclaimer, the term of this patent is extended or adjusted under 35 U.S.C. 154(b) by 57 days.

(21) Appl. No.: 10/430,299

(22) Filed: May 7, 2003

(65) Prior Publication Data

US 2004/0008430 A1 Jan. 15, 2004

Related U.S. Application Data

(60) Provisional application No. 60/380,005, filed on May 7, 2002.

(51) Int. Cl.[7] .................................................. G02B 5/08
(52) U.S. Cl. ...................................................... 359/846
(58) Field of Search ............................... 359/573, 569, 359/572, 290, 291, 295, 900

(56) References Cited

U.S. PATENT DOCUMENTS

| 4,076,387 | A | | 2/1978 | Haas et al. |
| 5,650,880 | A | | 7/1997 | Shuter et al. |
| 5,954,991 | A | | 9/1999 | Hong et al. |
| 6,631,032 | B2 | * | 10/2003 | Ryutov et al. ............. 359/573 |
| 2003/0227695 | A1 | | 12/2003 | Borra et al. |

OTHER PUBLICATIONS

Borra E F. Ritcey A M: 'Tiltable Liquid Mirror Telescopes' Proc.Spie—Int.Soc.Opt.Eng., vol 4003, Mar. 29, 2000, pp. 331–336, XP009015487 USA.
Gwan Soo Park et al: 'Determination of the Curvature of the Magnetic Fluid Under the External Forces'IEEE Transactions on Magnetics, IEEE Inc. New York, US. vol. 38, no. 2, Mar. 2002, pp. 957,960, XP001117366 ISSN: 0018–9464.
E.F. Borra, A.M. Ritcey, E. Artigau, "Floating Mirrors", Astrophysical Journal Letters, 516, L115.
Whitehead and Shutter, Astrohysical Journal Letters 1994, pp, L139–L141, vol. 418.
Ragazzoni, R: Marchetti, E. "Aliquid Adaptive Mirror", Astronomy and Strphysics, pp. L17–L19, vol. 283.
Raggazzoni, R; Marchette, E., Claudi, R. "Magnetic Driven Liquid Mirrors in Orbiting Telescopes" Stronomy and Astrophysics Supplement, p. 175 v. 115.
Cugat, et al. "Deformable Magnetic Mirror for Adaptive Optics: Technological Aspects" Sensors and Actuators A, 2001, 89.
P. Berger, N.B. Adelman, K.J. Beckman, D.J. Campbell, A.B. Ellis and G.C. Lisensky, J., Chem. Ed. 1999, 76, 943.
P.C. Lee and D. Meisel, J. Phys. Chem. 1982, 86, 3391.
K.C. Gordon, J.J. McGarvey and K.P. Taylor, J. Phys. Chem, 1989, 93, 6814.
U.S. Appl. No. 60/371,089, filed Apr. 2002, Borra et al.

* cited by examiner

Primary Examiner—Euncha P. Cherry
(74) Attorney, Agent, or Firm—Ogilvy Renault, LLP

(57) ABSTRACT

This invention relates to a new type of reflective optical element made of a fluid that responds to a force if subjected to a magnetic field. As a consequence, one can impose any shape one wants to the reflecting surface by generating an appropriate magnetic field geometry with permanent magnets, electromagnets or a combination of permanent magnets and electromagnets, or the like. A preferred embodiment uses a ferromagnetic fluid made of water containing ferromagnetic nanoparticles. Liquid ferromagnetic surfaces thus obtained were successfully shaped using magnetic fields. In another preferred embodiment, to modify the reflectivity of the optical element, a reflective layer, such as a nano-engineered silver reflecting surface, is deposited on the surface of the magnetically sensitive fluid. The surface of the reflecting layer can therefore be warped by applying a magnetic field to the fluid. Coated or uncoated magnetically deformable liquid surfaces with reflective layers allows one to make inexpensive and versatile high-quality reflecting mirrors having complex shapes. The shapes of the reflecting surfaces can be changed within short time periods by changing the shapes of the magnetic fields.

34 Claims, 2 Drawing Sheets

Figure 1 shows a three-dimensional rendering obtained by measuring a sample of one of our magnetically deformed surfaces with an interferometer.
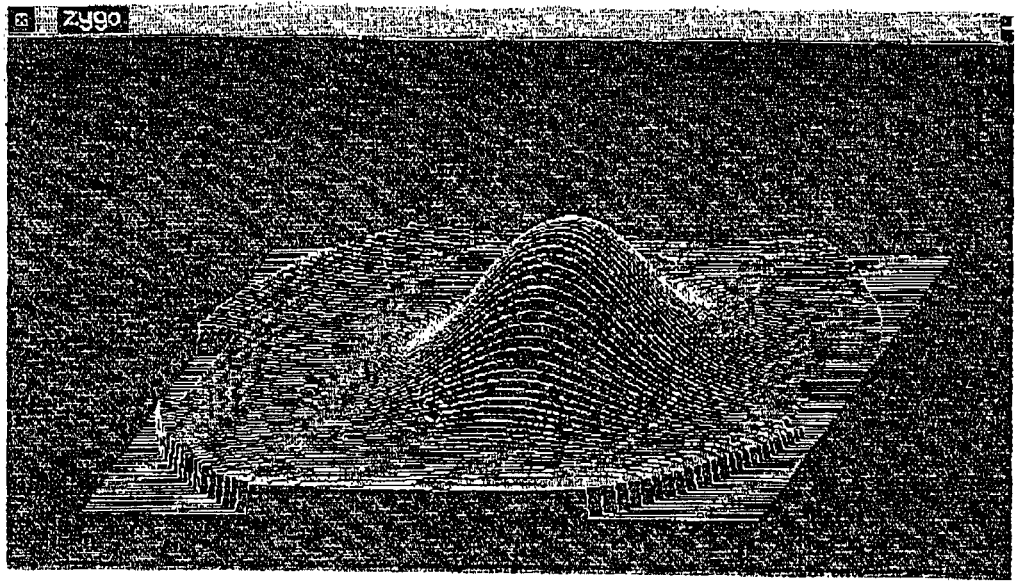

Figure 2 shows the deformation measured along a line running through the center of the surface shown in Fig. 1.
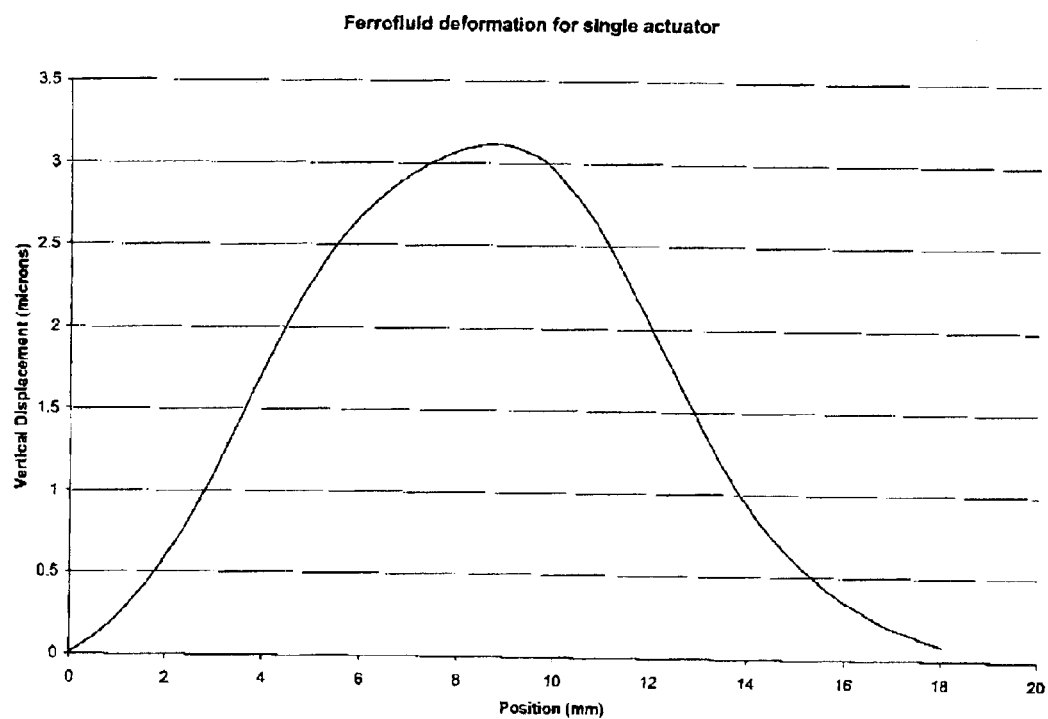

REFLECTING MIRRORS SHAPED WITH MAGNETIC FIELDS

BACKGROUND OF THE INVENTION (a) Field of the Invention

The invention relates to a new type of reflecting mirror that is made of a fluid, such as a ferromagnetic fluid, that responds to forces induced by magnetic fields, so that one can shape the reflecting surface as desired with an appropriately shaped magnetic field. To modify the reflective properties of the optical element surface, a reflective layer may be deposited on the magnetically sensitive fluid.

(b) Description of Prior Art

Optics is an enabling technology and optical elements are used in a large variety of technological applications. In general, it can be stated that the optical design of any instrument can be simplified by using aspheric surfaces. Aspheric surfaces, with the notable exception of a paraboloid, are difficult to obtain with solid optics. There are thus a vast number of possible applications for magnetically deformable liquid mirrors. For example, the surface of a liquid mirror deformed by magnetic forces could be segmented into multiple micromirrors that could individually be shaped at will.

Several fluids are affected by magnetic forces. For example, it is well known that the introduction of ferromagnetic particles in water or oil renders the fluid ferromagnetic. It is also known that currents sent through a conducting fluid generate magnetic fields so that the fluid can respond to the force resulting from an externally applied magnetic field.

Flat as well as parabolic rotating liquid mirrors have previously been made using liquid metals such as mercury and gallium. These are monolithic mirrors consisting of a liquid metal that is poured over into a solid container. However, they cannot be shaped by magnetic fields. Liquid mirrors using colloidal particles have been proposed (E. F. Borra, A. M Ritcey, E. Artigau, 1999 "Floating Mirrors"; Astrophysical Journal Letters, 516, L115). The mirrors discussed by Borra et al, are either flat or can be shaped by rotation. Magnetically shaped liquid mirrors have been described in the scientific literature. These mirrors are monolithic mirrors consisting of liquid mercury in which one may, or may not, introduce colloidal particles therein to render it ferromagnetic, after which they are poured into a solid container. Whitehead and Shutter (Astrophysical Journal Letters 1994, Vol. 418, pp. L139–L141, and U.S. Pat. No. 5,650,880) propose to use ferromagnetic liquid mercury specifically to transform the parabolic shape resulting from a rotating liquid into a sphere. Ragazzoni, R.; Marchetti, E. "A Liquid Adaptive Mirror"; Astronomy and Astrophysics vol 283, pp. L17–L19 propose to use monolithic liquid mercury driven by an electrical current flowing in the liquid and magnetic coils, specifically to be used as a deformable surface, in instrumentation used by astronomical telescopes, that compensates for wavefront distortion introduced by the earth atmosphere. They also made and tested a prototype. Ragazzoni, R., Marchetti, B., Claudi, R. "Magnetic Driven Liquid Mirrors in Orbiting Telescopes"; Astronomy and Astrophysics Supplement, v.115, p.175 propose to use ferromagnetic liquid mercury as the primary mirror of a space-based astronomical telescope. Mirrors using magnetic forces to deform a solid reflective membrane have been demonstrated by Cugat, et al, "Deformable Magnetic Mirror for Adaptive Optics: Technological Aspects"; Sensors and Actuators A, 89 (2001). Their approach uses permanent magnets glued or otherwise attached to the underside of a membrane. The magnets are then pulled by an array of coils separated from the membrane by an air gap. All these mirrors are high-reflectivity mirrors.

However, ferromagnetic mercury mirrors are massive due to the density of mercury. For the same magnetic field, larger deformations can be obtained with lower density materials. Moreover, mercury is toxic and it is a handicap for several applications. Finally, only high-reflectivity magnetically shaped mirrors have been developed; for applications such as ophthalmology, low-reflectivity mirrors are suitable. There therefore exists a need for new liquid mirrors shaped with magnetic fields.

SUMMARY OF THE INVENTION

It is an object of the present invention to overcome the problems mentioned previously.

It is an object of the present invention to provide uncoated liquids having low-reflectivity which are affected by magnetic fields to make deformable mirrors for optical applications.

It is an object of the present invention to provide coated fluids, which are affected by magnetic fields and which normally would have low-reflectivity, with a reflective layer to make deformable mirrors for optical applications.

It is another object of the present invention to provide optical elements that are far less expensive than conventional optical elements that use solid substrates.

It is another object of the present invention to provide reflective mirrors that are far more versatile since they make it possible to achieve very complex shapes that are difficult or impossible to make with solid optical elements.

It is another object of the present invention to rapidly modify the shapes of optical elements by changing the shapes of the magnetic fields applied thereto.

It is another object of the present invention to open the possibility of making reflecting mirrors having complex shapes that are controllable by suitably shaping magnetic field geometries.

It is yet another object of the present invention to eliminate the air gap and permanent magnets, and to permit a thinner membrane while solving problems due to surface defects resulting from print-through and low resonant frequencies.

These and other objects of the present invention may be achieved by providing a process for ma-ling liquid reflective mirrors which comprises providing a non-metallic fluid, under conditions to form a magnetically shapeable fluid, and magnetically shaping the magnetically shapeable fluid to a desired configuration. The top surface of the magnetically shapeable fluid may be coated with particles capable of forming a reflective layer.

The invention also relates to a liquid reflecting mirror that comprises a magnetically shapeable non-metallic fluid that is magnetically shaped to a desired configuration.

BRIEF DESCRIPTION OF THE DRAWINGS

FIG. 1 shows a three-dimensional rendering obtained by measuring a sample of a magnetically deformed surface according to the invention with an interferometer.

FIG. 2 shows the deformation measured along a line running through the center of the surface shown in FIG. 1.

DESCRIPTION OF PREFERRED EMBODIMENT

In liquid reflective mirrors according to the present invention, the basis of the optical element consists of a non-metallic fluid which may be an organic material such as oil or an inorganic material such as water or inorganic oil (e.g. silicon oil), in under conditions to form a magnetically shapeable fluid. One way to render a fluid magnetically shapeable is to introduce ferromagnetic particles, which might be covered by a surfactant, in the fluid Another way to render a fluid magnetically shapeable is by circulating electrical currents through an electrically conductive fluid. Electrical currents generate magnetic fields so that the fluid can respond to a force resulting from an externally applied magnetic field. Usually, the resulting mirror has a low-reflectivity since the magnetically shapeable fluid normally has a low-reflectivity. The difference with the prior art is significant because ferromagnetic mercury mirrors are more massive, due to the density of mercury which is approximately 14 times greater than that of water or oil as used in mirrors according to the present invention. Lower density allows one to obtain a larger deformation for the same magnetic field. Furthermore, considering the large variety of host liquids that the present invention permits, a larger choice of colloidal particles and surfactants can be used. Larger magnetic susceptibilities and, consequently, greater sensitivity to magnetic fields are obtained. Lower density and greater magnetic susceptibility allow larger deformations and faster time responses. The present invention allows the use of liquids that are not toxic, while mercury is toxic: a handicap for many applications. Moreover, cheaper fluids than mercury can be used, reducing the costs of liquid reflecting mirrors.

The preparation of a ferrofluid, which is an example of a magnetically shapeable fluid according to the invention, is made by known techniques, as in P. Berger, N. B. Adelman, K. J. Beckman, D. J. Campbell, A. B. Ellis and G. C. Lisensky, J. Chem. Ed. 1999, 76, 943 Two major steps are required to synthesize a ferrofluid The first is to provide magnetic nanoparticles, which are chemically stable in the liquid carrier, that will be dispersed in the colloidal suspension. The magnetic particles that are present in the ferrofluid are usually magnetite, $Fe_3O_4$, although other magnetic particles may be used. The second synthetic step is the dispersion of the magnetic particles into a carrier liquid by utilizing a surfactant to create a colloidal suspension. Aqueous-, oil-, and liquid-metal-based (mercury, gallium alloys) ferrofluids have been developed with the proper choice of surfactant. Surfactants, such as tetramethylammonium hydroxide $(CH_3)_4NOH$, for use with the magnetic particles are well-known to those skilled in the art.

According to a preferred embodiment, deformable mirrors are made by coating magnetically shapeable fluids of particles with a reflective layer. This can be achieved with several techniques. The preferred reflective layer is made of colloidal particles, preferably nanoparticles, which can be metallic or non-metallic. The preferred nanoparticles are silver particles, although any other suitable reflecting metallic particles from the periodic table can be used, such as gold, aluminum, or the like. Nanoparticles can be obtained by chemical means such as reduction, or non chemical means such as laser treatment or mechanical ablation from a solid. The reflecting particles can be coated with a surfactant, which are well-known to those skilled in the art, to stabilize the reflecting layer. Coated fluids usually result in high-reflectivity mirrors, especially when reflecting metallic nanoparticles are used.

In another preferred embodiment, the magnetically shapeable fluid can also be covered with a flexible membrane that follows the deformation of the magnetically shapeable fluid, and the latter may be made with numerous techniques. For example, the membrane may be made of Mylar™, Melinex™, polyimide, polyamide, gold coated nickel, silicon nitride or any coated or uncoated polymer film. If the membrane is uncoated, it forms the mirror surface. If the membrane is in direct contact with the magnetically shapeable fluid, the coated or uncoated membrane forms the mirror surface and follows the deformation of the liquid substrate.

In another preferred embodiment, this flexible membrane can then be coated with a reflective layer using several techniques. For this coating purpose, one can use chemical deposition in aqueous or non-aqueous media, electrodeposition, vaporization, coating by sputtering from hot electrically heated elements, or any other method known by one skilled in the art. In such a membrane arrangement, the fluid supports the surface allowing a thinner membrane than is possible with mirrors employing membranes over an air gap. The magnetically shapeable fluid provides a means to deform the membrane that is free of print through effects.

In another preferred embodiment, a transparent rigid membrane is disposed above and not directly in contact with the liquid reflective mirror. This transparent rigid membrane protects the optical surface from dust, evaporation or other contamination.

The appropriate magnetic field geometries, needed to give the desired shapes to the surfaces, can be generated with permanent magnets, electromagnets or a combination of permanent magnets and electromagnets and the like. Electromagnets are made by circulating electrical currents inside appropriately shaped conducting elements. The magnetic effects of the currents can be amplified by including appropriately shaped materials that intensify the magnetic field generated by the electrical currents. A preferred embodiment that was realized uses an array of magnetic elements made of tightly wound loops of conducting wires surrounding solid cores of ferromagnetic material. An electrical current circulates in the conducting wires.

According to another preferred embodiment for coated fluids, the process according to the invention may consist of the four steps listed below. Prototype mirrors have been made with the technique described below.

1. Preparation of a ferrofluid by known techniques such as in the technique mentioned earlier (P. Berger, N. B. Adelman, K. J. Beckman, D. J. Campbell, A. B. Ellis and G. C. Lisensky, J. Chem. Ed. 1999, 76, 943).
2. Formation of silver nanoparticles by chemical reduction in an aqueous medium as described in the literature. For examples P. C. Lee and D. Meisel, J. Phys. Chem. 1982, 86, 3391 describe three procedures to produce silver nanoparticles. In a first procedure, $Ag_2SO_4$ (80 mg) is dissolved in ca. 200 mL of hot water and then mixed with 5 g of PVA dissolved in ca. 200 mL of hot water. The mixture is then bubbled with $H_2$ at near boiling temperature for 3 hours. A second procedure consists of adding portionwise a solution of $5 \times 10^{-3}$ M $AgNO_3$ (100 mL) to 300 miL of vigorously stirred ice-cold $2 \times 10^{-3}$ M $NaBH_4$. A solution of 1% PVA (50 mL) is added during the reduction. The mixture is then boiled for ca. 1 h to decompose any excess of $NaBH_4$. A third procedure consists of dissolving $AgNO_3$ (90 mg) in 500 mL of $H_2O$ and bring to boiling. A solution of 1% sodium citrate (10 mL) is added. The solution is kept on boiling for ca. 1 h.
3. Coating of the particles with an organic stabilizing layer and simultaneous spontaneous concentration of the particles at the interface between two liquid phases. This step is accomplished by a modification of a method described in the literature (K. C. Gordon, J. J. McGarvey and K. P.

Taylor, J. Phys. Chem., 1989, 93, 6814) and detailed in the U.S. patent application Ser. No. 60/371,089. More specifically, the aqueous suspension of nanopacticles of silver obtained as described above is shaken for example with an equal volume of a 1,2-dichloroethane solution of 1,10-phenanthroline. Other ligands, such as $Cu(DMP)_2 BF_4$ where DMP stands for 2,9-dimethyl-1,10-phenanthroline, could obviously be used for coating the nanoparticles, as well as other solvents as will be appreciated by those skilled in the art. Preferably, the obtaining of a concentrated suspension of coated nanoparticles is carried out by a shaking process. To achieved this, a mechanical paint shaker, that provides a vigorous and constant shaking for at least 5 minutes, is used. The step of concentrating the suspension is carried out as follows:

- a portion of the two phase system obtained is poured into a separatory funnel;
- the denser organic phase is removed through the funnel stopcock;
- the upper aqueous phase is removed by aspiration;
- the remaining suspension of nanoparticles, preferably silver nanoparticles, is removed along with residual quantities of the aqueous and organic phases, and is stored in a polypropylene container. The nature of the container has some importance, since a hydrophilic container would destabilize the suspension;
- for higher reflectivity, it is recommended to wash off the excess of $Cu(DMP)_2BF_4$ remaining in the organic phase after the preparation; this can be done by rinsing the concentrated suspension a few times with pure 1,2-dichloroethane;
- the above steps can be repeated, and several batches of the isolated suspension can be combined;

a reflective surface can be obtained by pouring the concentrated suspension onto water in a hydrophobic container, In such a container, the residual organic solvent, containing the suspended particles, completely surrounds the aqueous phase. Attempts to spread the suspension of particles on water in a hydrophilic container such as glass, would lead to a concentration of the particles at the interface between the aqueous phase and the minority denser organic phase.

4. The isolation of the concentrated interfacial suspension of particles and its subsequent spreading on a liquid substrate. In the present embodiment, the liquid substrate is the ferrofluid prepared in Step 1. After spreading the concentrated suspension over the liquid surface, water or solvent substantially evaporates, leaving coated particles substantially free of water or solvent. In case the support liquid is an organic liquid, an aqueous solution of a surfactant is added during the spreading operation to lower the surface tension of water, allowing it to coat the top surface of the organic liquid.

Prototypes of magnetically deformed liquid surfaces using uncoated and metal-coated ferromagnetic liquids have been made. Several magnetic liquid mirrors have been extensively tested. Interferometric tests at a wavelength of 630 nm were carried out with an interferometer.

PRACTICAL APPLICATIONS OF THE INVENTION

Optics and electronics are an enabling technologies. A large number of applications: telecommunications, projection systems, aspheric surfaces in optical systems (e.g. microscopes, telescopes, lithographic machines) can thus be foreseen for high-reflectivity mirrors Moreover, the present invention could be used as replacement for Micro Electro-Mechanical Systems (MEMS), which are used among others to redirect light in switches used in telecommunications.

Low-reflectivity optical elements, usually made of uncoated polished glass, are commonly used for optical-testing purposes. Magnetically shaped low-reflectivity liquids can be used for ophthalmologic applications. They can generate surfaces having complex shapes that are known and can be used to determine the shape of the lens of the human eye, the crystalline lens. This allows the measurement of high-order aberrations (optical defects) of the crystalline lens so that they can be corrected with the appropriate medical procedure, for example, surgery (e.g. with a laser beam) that reshapes the lens. The magnetically shaped reference surface can further be used to verify the correction made to the lens of the eye before, during or after the procedure. In current surgical procedures, one only removes the defocus aberration (correct the focal length). The advantage of measuring and removing high-order aberrations is that the vision of the patient can be further improved. One can thus envision removing Coma, Astigmatism and even higher order aberrations.

Although the invention has been described with reference to preferred embodiments, it is understood that modifications are possible within the scope of the appended claims.

What is claimed is:

1. Process for making liquid reflective mirrors, which comprises
    providing a non-metallic fluid under conditions to form a magnetically shapeable fluid;
    coating a top surface of said magnetically shapeable fluid with one of particles capable of forming a reflective layer and flexible membrane; and
    magnetically shaping said magnetically shapeable fluid to a desired configuration.

2. Process according to claim 1, which comprises dispersing colloidal particles into said non-metallic fluid to render said non-metallic fluid magnetically shapeable.

3. Process according to claim 2, wherein said colloidal particles are ferromagnetic.

4. Process according to claim 3, wherein said ferromagnetic colloidal particles comprise nanoparticles.

5. Process according to claim 1, wherein said magnetically shapeable non-metallic fluid is inorganic or organic.

6. Process according to claim 5, wherein said magnetically shapeable non-metallic fluid in inorganic and comprises water or an inorganic oil.

7. Process according to claim 5, wherein said magnetically shapeable non-metallic fluid is organic and comprises an organic oil.

8. Process according to claim 1, wherein said magnetically shapeable non-metallic fluid is an electrically conductive fluid subject to electrical that generate magnetic fields and render said electrically conductive fluid magnetically shapeable.

9. Liquid according to claim 1, which comprises applying a transparent rigid membrane over said liquid reflective mirror to protect said liquid reflective mirror from contamination.

10. Process according to claim 1, wherein said particles capable of forming said reflective layer comprises colloidal particles.

11. Process according to claim 10, wherein said colloidal particles capable of forming said reflective layer comprise nanoparticles.

12. Process according to claim 1, wherein said particles capable of forming said reflective layer are coated with a surfactant.

13. Process according to claim 1, wherein said particles capable of forming said reflective layer are metallic or non-metallic.

14. Process according to claim 13, wherein said particle are metallic and comprise particles of silver, gold or aluminum.

15. Process according to claim 1, which comprises shaping said magnetically shapeable fluid by means of an external magnetic field.

16. Process according to claim 15, which comprises applying said external magnetic field by means of permanent magnets, electromagnets or a combination thereof.

17. Process according to claim 15, which comprises modifying geometry of said external magnetic field.

18. Process according to claim 1, which comprises coating said flexible membrane with particles capable of forming a reflective layer.

19. Process according to claim 1, which comprises applying a transparent rigid membrane over said liquid reflective mirror to protect said liquid reflective mirror from contamination.

20. Liquid reflective mirror comprising a magnetically shapeable non-metallic fluid having a top surface coated with one of particles capable of forming a reflective layer and a flexible membrane, said liquid reflective mirror being magnetically shaped to a desired configuration.

21. Liquid reflective mirror according to claim 20, wherein said magnetically shapeable non-metallic fluid comprises colloidal particles.

22. Liquid reflective mirror according to claim 21, wherein said colloidal particles are ferromagnetic.

23. Liquid reflective mirror according to claim 22, wherein said ferromagnetic colloidal particles comprise nanoparticles.

24. Liquid reflective mirror according to claim 20, wherein said magnetically shapeable non-metallic fluid is inorganic or organic.

25. Liquid reflective mirror according to claim 24, wherein said magnetically shapeable non-metallic fluid is inorganic and comprises water or an inorganic oil.

26. Liquid reflective mirror according to claim 24, wherein said magnetically shapeable non-metallic fluid is organic and comprises an organic oil.

27. Liquid reflective mirror according to claim 20, wherein said magnetically shapeable non-metallic fluid is an electrically conductive fluid subject to electrical currents that generate magnetic fields and render said electrically conductive fluid magnetically shapeable.

28. Liquid reflective mirror according to claim 20, wherein said particles capable of forming said reflective layer comprises colloidal particles.

29. Liquid reflective mirror according to claim 28, wherein said colloidal particles capable of forming said reflective layer comprise nanoparticles.

30. Liquid reflective mirror according to claim 20, wherein said particles capable of forming said reflective layer are coated with a surfactant.

31. Liquid reflective mirror according to claim 20, wherein said particles capable of forming said reflective layer are metallic or non-metallic.

32. Liquid reflective mirror according to claim 31, wherein said magnetically shapeable suspension comprise particles of silver, gold or aluminum.

33. Liquid reflective mirror according to claim 20, wherein said flexible membrane is coated with particles capable of forming a reflective layer.

34. Liquid reflective mirror according to claim 20, for use in ophthalmologic applications.

* * * * *